United States Patent
Manaka (10) Patent No.: US 11,323,005 B2
(45) Date of Patent: May 3, 2022

(54) COOLING JACKET DEVICE AND ROTARY ELECTRIC MACHINE

(71) Applicant: FANUC CORPORATION, Yamanashi (JP)

(72) Inventor: Yuuya Manaka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 135 days.

(21) Appl. No.: 16/860,126

(22) Filed: Apr. 28, 2020

(65) Prior Publication Data
US 2020/0381975 A1    Dec. 3, 2020

(30) Foreign Application Priority Data

May 27, 2019 (JP) .............................. JP2019-098405
Jan. 16, 2020 (JP) .............................. JP2020-005156

(51) Int. Cl.
| *H02K 9/19* | (2006.01) |
| *H02K 5/20* | (2006.01) |
| *H02K 9/193* | (2006.01) |

(52) U.S. Cl.
CPC .............. *H02K 5/20* (2013.01); *H02K 9/193* (2013.01); *H02K 5/203* (2021.01); *H02K 2213/12* (2013.01)

(58) Field of Classification Search
CPC .......... H02K 5/203; H02K 5/20; H02K 9/193; H02K 9/19; H02K 2213/12; H02K 1/20
USPC .......................... 310/52, 54, 58, 59, 60 A, 64
See application file for complete search history.

(56) References Cited

U.S. PATENT DOCUMENTS

| 2,417,686 | A | * | 3/1947 | Hugin | ................. | H02K 49/043 |
| | | | | | | 310/93 |
| 2004/0080220 | A1 | * | 4/2004 | Yamamoto | ............... | H02K 5/20 |
| | | | | | | 310/64 |
| 2019/0181717 | A1 | * | 6/2019 | Zhou | ........................ | H02K 9/22 |

FOREIGN PATENT DOCUMENTS

JP          2015095908 A     5/2015

* cited by examiner

*Primary Examiner* — Quyen P Leung
*Assistant Examiner* — Alexander Moraza
(74) *Attorney, Agent, or Firm* — Studebaker & Brackett PC (57) ABSTRACT

The present invention is intended to provide: a cooling jacket device 1 which offers excellent cooling performance, is easy to manufacture and enables cost reduction; and a rotary electric machine including the cooling jacket device. The cooling jacket device includes: a plurality of jacket bodies each of which is formed in a substantially flat plate shape and includes therein a channel communicating with a pair of inlet/outlet ports formed in an outer surface of the jacket body, and allowing a refrigerant to flow therethrough; a plurality of coupling members which couple and retain the plurality of jacket bodies in conformity with an outer peripheral shape of a heat generating portion of the rotary electric machine; and a plurality of tubular members which are connected to the inlet/outlet ports, through which the refrigerant discharged from the inlet/outlet port of one of the plurality of jacket bodies is sent to the inlet/outlet port of another one of the plurality of jacket bodies so that the refrigerant flows through the channels of the plurality of jacket bodies.

4 Claims, 8 Drawing Sheets

-- PRIOR ART --

COOLING JACKET DEVICE AND ROTARY ELECTRIC MACHINE

This application is based on and claims the benefit of priority from Japanese Patent Application No. 2019-098405 and 2020-005156, filed on 27 May 2019 and 16 Jan. 2020, the content of which is incorporated herein by reference.

BACKGROUND OF THE INVENTION

Field of the Invention

The present invention relates to a cooling jacket device and a rotary electric machine.

Related Art

Patent Document 1 discloses a rotary electric machine including: a housing having a cylindrical portion in which a first channel having an inlet port and an outlet port is formed; a stator fixed to an inner peripheral surface of the housing and having a plurality of slots accommodating therein a coil which is isolated by an insulator disposed between the coil and a stator core; a rotor arranged such that a gap is formed between the rotor and an inner peripheral surface of the stator; and a cooling cover in which a second channel connected to the first channel is formed, and which is disposed to be in contact with end faces of the stator core at both ends of the stator.

In the cooling jacket device of Patent Document 1, the channel is constituted by a metal pipe. The metal pipe is provided to be wound in a circumferential direction of the rotatory electric machine, while having a plurality of bent points, and is wrapped with plates.

Patent Document 1: Japanese Unexamined Patent Application, Publication No. 2015-95908

SUMMARY OF THE INVENTION

Figure 7:
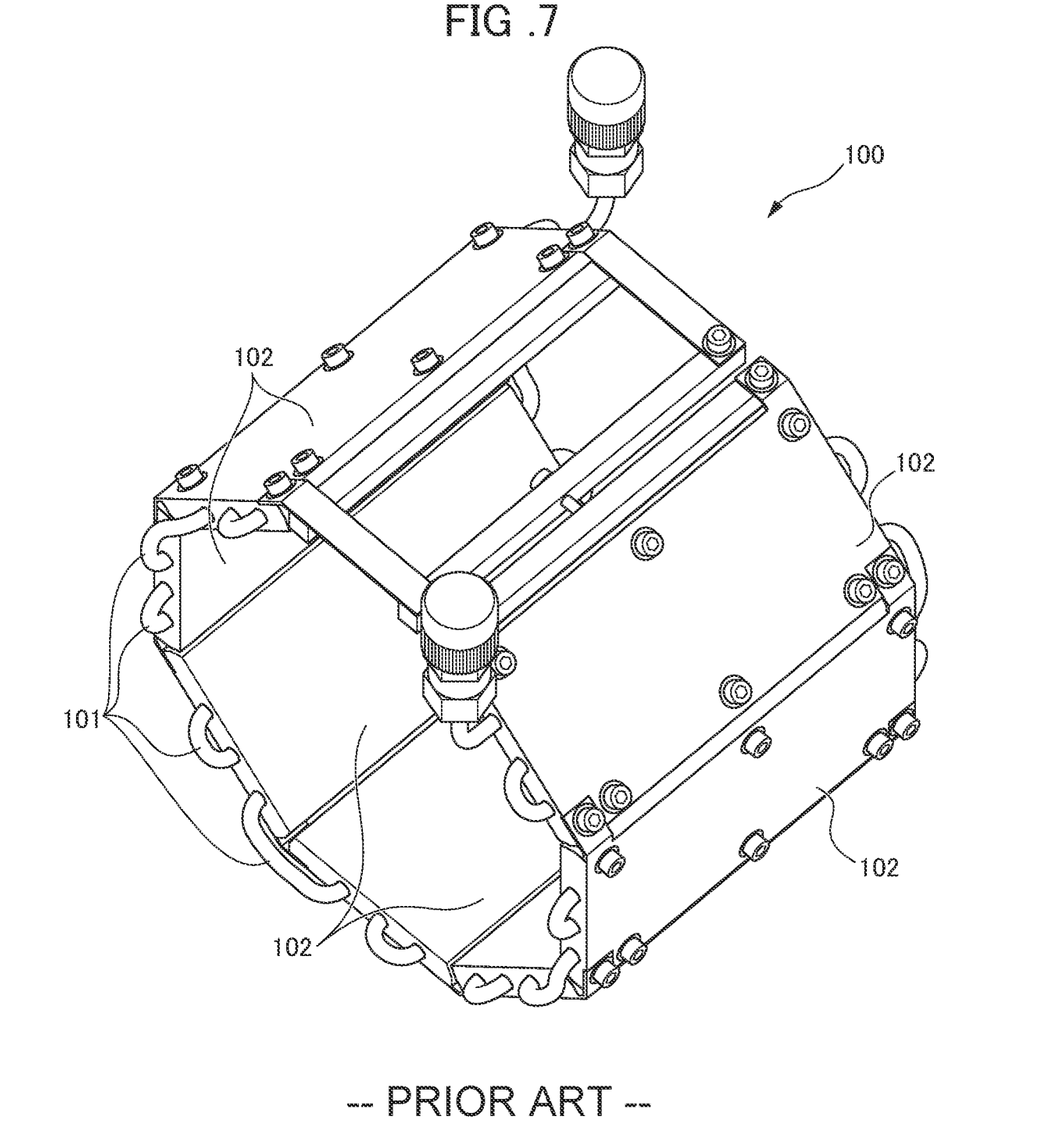
FIG. 7 is a perspective view showing a cooling jacket device of the known art.

However, in the cooling jacket device 100 of Patent Document 1, as shown in, for example, FIG. 7, since the entire channel of the cooling jacket (jacket body) is constituted by the metal pipe 101, the cooling jacket (jacket body) has a shape along the outside shape of the rotary electric machine such as a motor. Inconveniently, the cooling jacket device is not easy to mount to the motor.

Further, due to the structure in which the metal pipe 101 is wrapped with plates 102, gaps are formed between the metal pipe 101 and the plates 102, thereby causing a problem that cooling efficiency (heat exchange efficiency) is reduced.

An aspect of the cooling jacket device according to the present disclosure is intended for cooling a heat generating portion of a rotary electric machine by being disposed to surround the heat generating portion. The cooling jacket device including: a plurality of jacket bodies each of which is formed in a substantially flat plate shape and includes therein a channel communicating with a pair of inlet/outlet ports formed in an outer surface of the jacket body, the channel allowing a refrigerant to flow therethrough; a plurality of coupling members which couple and retain the plurality of jacket bodies in conformity with an outer peripheral shape of the heat generating portion of the rotary electric machine; and a plurality of tubular members which are connected to the inlet/outlet ports, through which the refrigerant discharged from the inlet/outlet port of one of the plurality of jacket bodies is sent to the inlet/outlet port of another one of the plurality of jacket bodies so that the refrigerant flows through the channels of the plurality of jacket bodies.

An aspect of the rotary electric machine according to the present disclosure includes the above-described aspect of the cooling jacket device.

In the cooling jacket device and the rotary electric machine according to an embodiment of the present disclosure, since a coupling portion of the jacket bodies of the cooling jacket device is provided with no metal pipes, the cooling jacket device can be easily mounted to the rotary electric machine such as a motor.

In addition, unlike the known art which a metal pipe is used, the embodiment includes no gaps, thereby making it possible to significantly improve the cooling efficiency.

Further, since no metal pipe needs to be used, the present disclosure eliminates the need for complicated work of inserting a metal pipe between plates and bending the metal pipe. As a result, the cooling jacket device of the present disclosure is easy to fabricate and manufacture, is composed of a reduced number of components, thereby enabling enhancement of cost effectiveness.

DETAILED DESCRIPTION OF THE INVENTION

A cooling jacket device and a rotatory electric machine according to an embodiment will be described with reference to FIGS. 1 to 3. The present embodiment will be described on the precondition that the rotary electric machine is configured as a motor. However, the rotary electric machine of the present disclosure may be embodied as other types such as a generator.

As shown in, for example, FIGS. 1, 2A, 2B and 3, the cooling jacket device 1 of the present embodiment is composed of a metal having a high thermal conductivity. The cooling jacket device 1 includes a plurality of jacket bodies (cooling jackets) 3 each of which is formed in a substantially flat plate shape. Each jacket body 3 has therein a channel 2 through which a refrigerant such as cooling water flows, and includes a refrigerant supply port (inlet/outlet port 4) and a refrigerant discharge port (inlet/outlet port 4) at an end portion thereof. The refrigerant is supplied to the channel 2 through the refrigerant supply port (inlet/outlet port 4), flows through the channel 2, and then, is discharged through the refrigerant discharge port (inlet/outlet port 4).

Figure 2A:
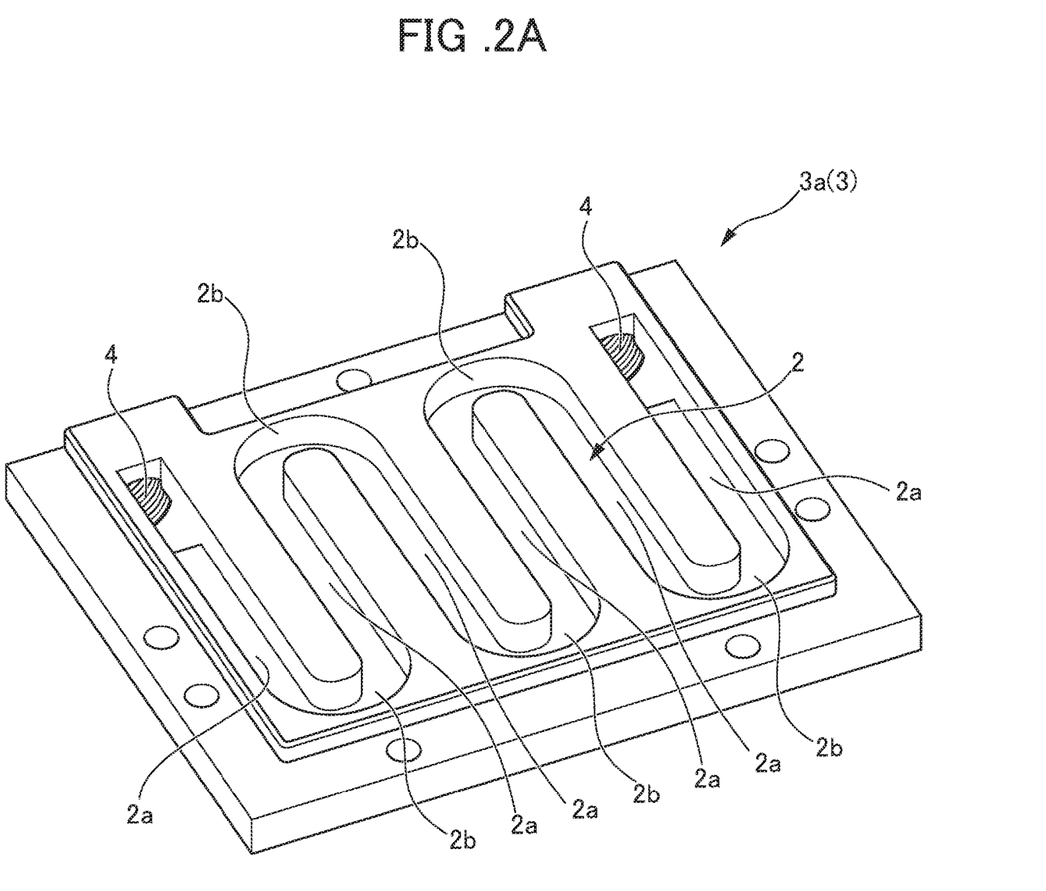
FIG. 2A is a perspective view showing a jacket body (a side of a body plate on which a channel is formed) of a cooling jacket device according to an embodiment of the present disclosure.
Figure 3:
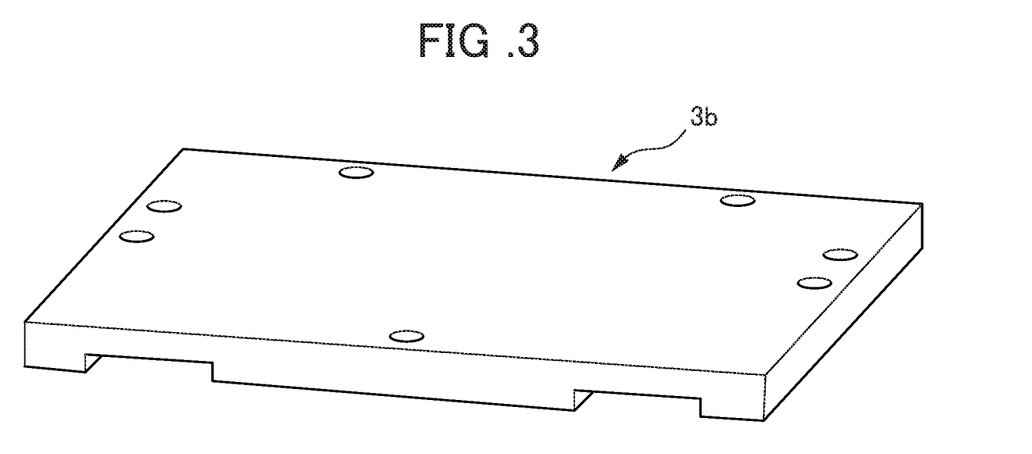
FIG. 3 is a perspective view showing a jacket, body (a closure plate) of the cooling jacket device according to the embodiment of the present disclosure.

As shown in FIG. 2A, the channel 2 is formed in a serpentine shape along a surface of the jacket body 3, the surface to be in contact with an outer peripheral surface of a heat generating portion of the rotary electric machine. Specifically, a plurality of straight portions 2a extending in a single direction are arranged parallel to each other with smallest possible intervals interposed therebetween, and each straight portion 2a has an end connected to an end of one adjacent straight portion 2a via a connecting portion 2b, and has the other end connected to an end of the other adjacent straight portion 2a via another connecting portion 2b. Thus, the straight portions 2a communicate with the connecting portions 2b that alternately connect the ends of the straight portions 2a, thereby forming the channel 2 as one continuous channel. As a result, it is ensured that a contact area between the refrigerant and the jacket body 3, i.e., a surface area of the channel 2 is as large as possible, thereby contributing to an increase in heat exchange efficiency.

One end of the channel 2 opens at an outer surface of the jacket body 3 to form the refrigerant supply port (4). The other end of the cooling channel 2 opens at the outer surface of the jacket body 3 to form the refrigerant discharge port (4) (FIGS. 2A and 2B).

Here, the jacket body 3 of the cooling jacket device 1 of the present embodiment is composed of a metal having a high thermal conductivity, such as aluminum or copper. The jacket body 3 is formed in a substantially flat plate shape and has a groove recessed in a thickness direction from one surface toward the opposite surface, the groove forming the channel 2 (the plurality of straight portions 2a and the plurality of connecting portions 2b). This groove communicates with the refrigerant supply port (4) and the refrigerant discharge port (4), and opens at the outer surface. A body plate 3a (FIGS. 2A and 2B) is formed to include the channel 2, the refrigerant supply port and the refrigerant discharge port (4). A closure plate 3b (FIG. 3) formed in a substantially flat plate shape is integrally, but detachably, attached to one surface of the body plate 3a. The closure plate 3b closes/seals the groove that opens at the one surface of the body plate 3a, whereby the channel 2 is formed. A plurality of jacket bodies 3 of the same type that are each composed of the body plate 3a and the closure plate 3b are provided in a disassemblable manner to form the cooling jacket device 1. Note that the jacket bodies 3 do not necessarily have to be disassemblable. The number of the disassemblable jacket bodies 3 may be three or larger. It is suitable that connection between the body plate 3a and the closure plate 3b is achieved by a metal gasket or the like so that the channel 2 is reliably closed/sealed.

The cooling jacket device 1 of the present embodiment is constituted by the plurality of jacket bodies 3 connected to each other via coupling members 5. Specifically, a hose 6 that is a tubular member as a refrigerant supply means is connected to the refrigerant supply port (4) of one of the jacket bodies 3. A hose 6 as a refrigerant discharge means is connected to the refrigerant discharge port (4) of another of the jacket bodies 3. The refrigerant supply port (4) of each of the remainder of the jacket bodies 3 is connected via a hose 6 to the refrigerant discharge port (4) of the adjacent jacket body 3. Note that a hose joint 7 as a coupling member for coupling the hose 6 is detachably attached to each of the refrigerant supply ports (4) and each of the refrigerant discharge ports (4).

In the cooling jacket device 1 having the configuration described above and the rotary electric machine provided with the cooling jacket device 1, the plurality of jacket bodies 3 respectively attached to the coupling members 5 provided in a disassemble manner are arranged such that one surface as a contact surface of each jacket body 3 is in contact with the outer peripheral surface of a heat generating portion of the rotary electric machine such as a motor. Further, the disassemblable coupling members 5 are coupled so that the plurality of jacket bodies 3 are fixed to respective predetermined positions.

Further, the hose 6 as the refrigerant supply means is connected to the refrigerant supply port (4) of one of the jacket bodies 3. The hose 6 as the refrigerant discharge means is connected to the refrigerant discharge port (4) of another of the jacket bodies 3. The refrigerant supply port (4) of each of the remainder of the jacket bodies 3 is connected via another hose 6 to the refrigerant discharge port (4) of the adjacent jacket body 3.

When a refrigerant (e.g., cooling water) is supplied through the hose 6 connected to the refrigerant supply port (4), the refrigerant flows through the channel 2 of the jacket body 3 of the cooling jacket device 1. The refrigerant is then discharged from the refrigerant discharge port (4) to be sent to the refrigerant supply port (4) of the next jacket body 3 through the hose 6. The refrigerant then flows through the channel 2 of the latter jacket body 3. After flowing sequentially through the channels 2 of the plurality of jacket bodies 3, the refrigerant is discharged from the refrigerant discharge port (4) of the last one of the jacket bodies 3, and then, sent to a heat exchanger via the hose 6. The refrigerant is cooled by way of heat exchange, and is sent again to the refrigerant supply port (4) of the jacket body 3 through the hose 6. In this way, the refrigerant circulates, thereby cooling the rotary electric machine. It is preferable to use, for example, highly flexible hoses made of fluoroplastic as the hoses 6. Use of such highly flexible hoses 6 contributes to improvement of handleability in attaching the hoses 6 and in mounting the cooling jacket device 1 to the rotary electric machine.

The cooling jacket device 1 and the rotary electric machine of the present embodiment differ from those of the known art in that the cooling jacket device includes no metal pipe at connecting portions and that each jacket body 3 is formed in a substantially flat plate shape. As a result, the cooling jacket device 1 can be easily mounted to the rotary electric machine such as a motor.

Further, the present embodiment, from which the gaps formed in the known art are eliminated, can significantly improve the cooling efficiency.

Furthermore, since no metal pile is used, the present embodiment can eliminate need for complicated work involved in the known art, such as inserting a pipe between plates and bending a metal pipe. Therefore, the cooling jacket device 1 of the present disclosure is easy to fabricate and manufacture.

Thus, the present embodiment achieves the cooling jacket device 1 that provides excellent cooling performance, is easy to manufacture, and enables cost reduction. The present disclosure also achieves a rotary electric machine including the cooling jacket device 1.

Figure 4:
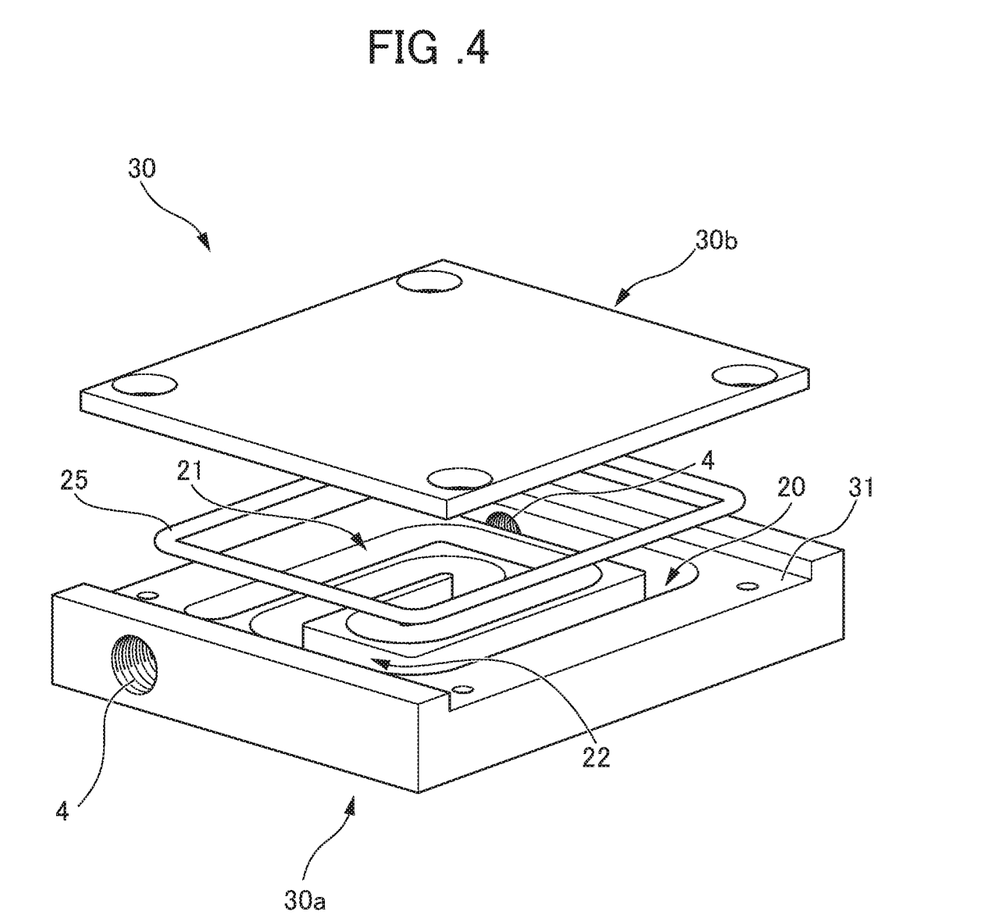
FIG. 4 is an exploded perspective view showing a jacket body of a cooing jacket device according to another embodiment of the present disclosure.

Next, a cooling jacket device as another embodiment of the present disclosure will be described with reference to FIG. 4. A jacket body 30 of the cooling jacket device shown in the exploded perspective view as FIG. 4 is composed of a body plate 30a formed in a substantially flat plate shape and a closure plate 30b formed in a substantially flat plate shape, the body plate 30a and the closure plate 30b being joined to each other in a disassemblable manner. A groove serving as a channel 20 is formed in a surface of the body plate 30a. The groove is recessed in a thickness direction of the body plate 30a and has a constant depth. The body plate 30a and the closure plate 30b have plane-projected shapes coinciding with each other. The closure plate 30b is joined to the body plate 30a such that the outer peripheral edges of the plates 30a and 30b completely coincide with each other, whereby the groove of the body plate 30a is sealed to form the channel 20 in the body plate 30a.

A quadrangular loop-shaped seal member 25 is sandwiched near the outer peripheral edge of a joining plane where the body plate 30a and the closure plate 30b are joined to each other. A seal member made from a material that is excellent in heat resistance, oil resistance, mechanical strength, and compression set resistance, such as HNBR (hydrogenated nitrile rubber), is applicable as the loop-shaped seal member 25.

Figure 1:
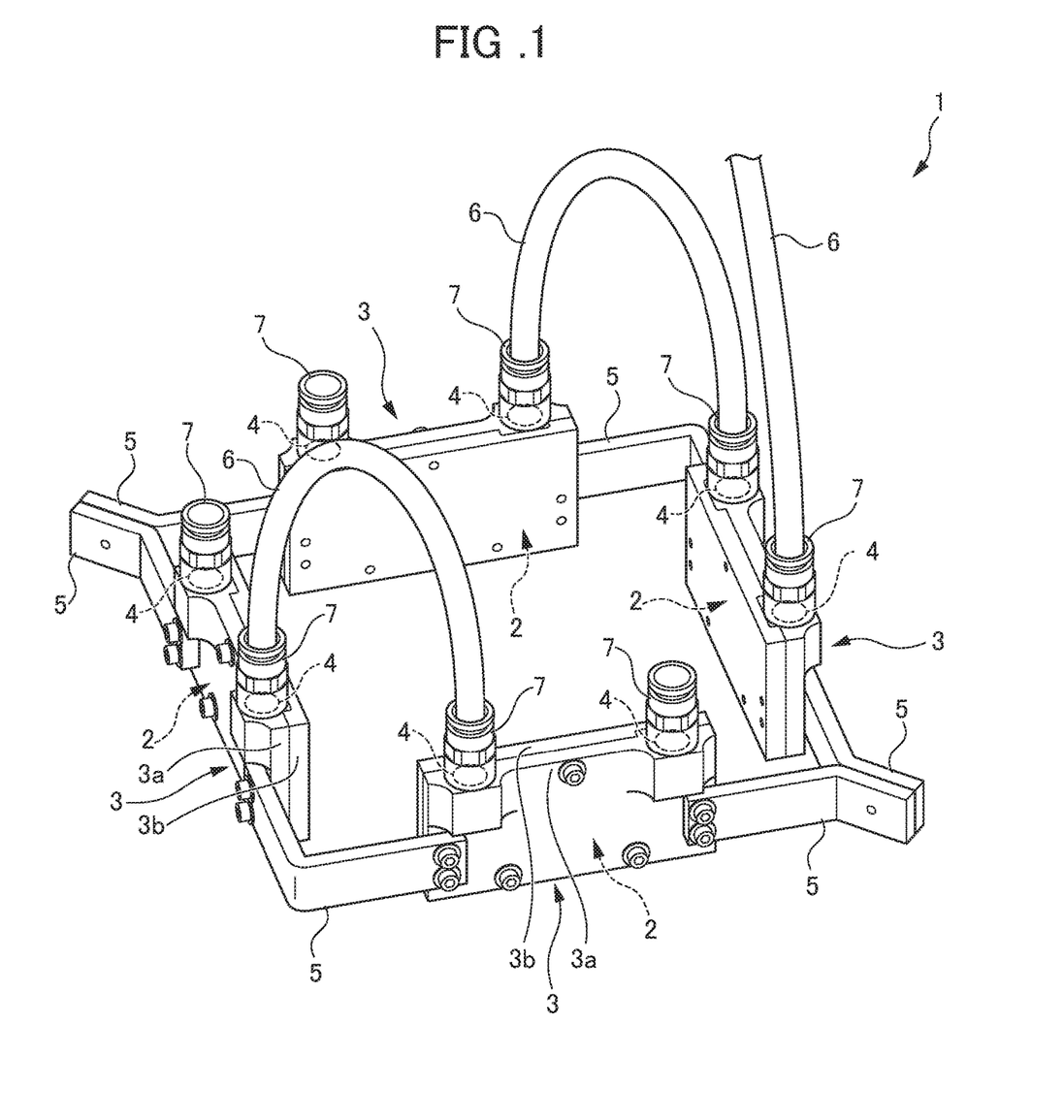
FIG. 1 is a perspective view showing a cooling jacket device according to an embodiment of the present disclosure.
Figure 2B:
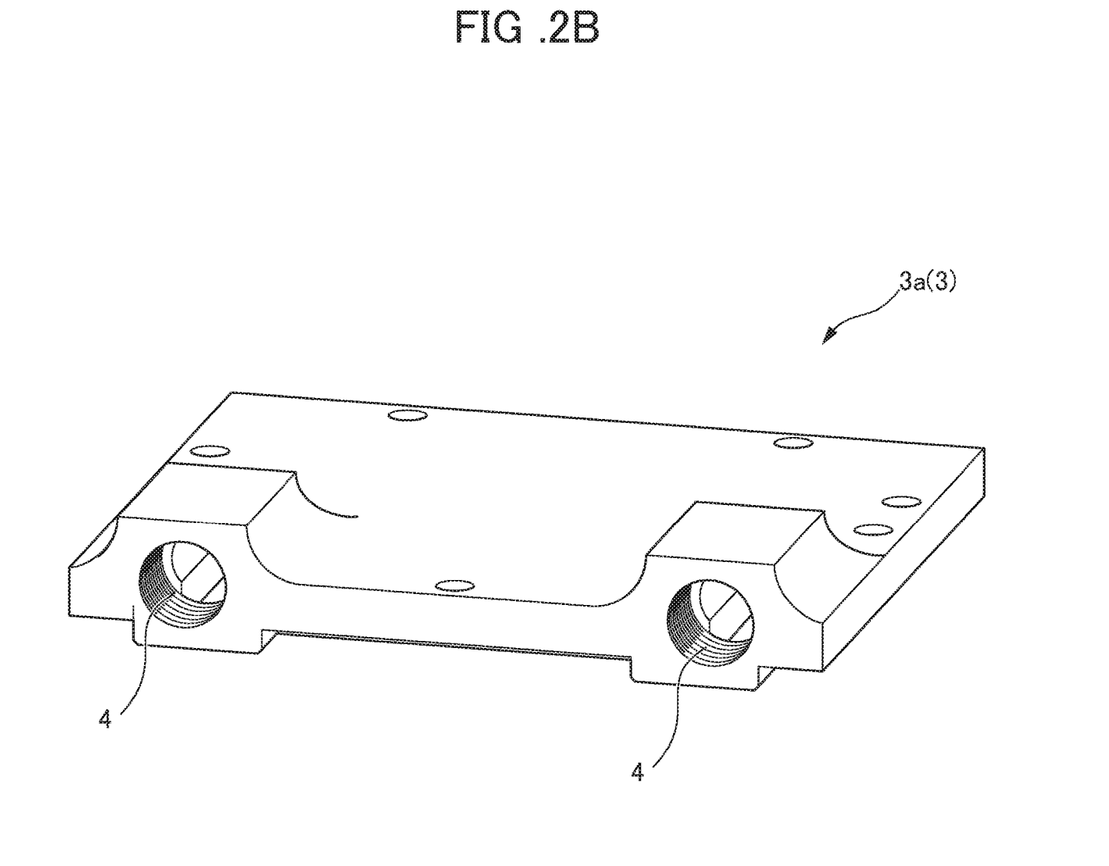
FIG. 2B is a perspective view showing a jacket body (an outer side of a body plate) of the cooling jacket device according to the embodiment of the present disclosure.

A configuration in which a plurality of jacket bodies 30 coupled to each other via coupling members form the cooling jacket device, and in which the cooling jacket device is applied to a rotary electric machine is substantially the same as the configuration of the cooling jacker device 1 shown in FIG. 1. The description concerning FIG. 1 applies to the present embodiment.

In the jacket body 30 shown in FIG. 4, the groove that forms the channel 20 (hereinafter, the groove is referred to as the channel as appropriate) of the body plate 30a differs in shape from that of the jacket body 3 shown in FIG. 2A. Specifically, as described earlier, the channel 2 of the body plate 3a of the jacket body 3 shown in FIG. 2A has a serpentine shape. On the other hand, the channel 20 of the body plate 30a of the jacket body 30 shown in FIG. 4 has a shape of a combination of oppositely-wound square spirals. Specifically, the channel 20 is composed of a centripetally-winding channel portion 21 and a centrifugally-winding channel portion 22 that are connected to each other in a vicinity of the center of the body plate 30a so as to be continuous with each other. The centripetally-winding channel portion 21 has the shape of a square spiral that winds centripetally inwardly in a clockwise direction (counterclockwise direction) from the refrigerant supply port (4) toward the center of the body plate 30a. The centrifugally-winding channel portion 22 has the shape of an inverted square spiral that starts from the vicinity of the center of the body plate 30a corresponding to a flow end of the channel as the centripetally-winding channel portion. 21, and that after being folded, winds centrifugally outwardly in the counterclockwise direction (clockwise direction) so as to reach the refrigerant discharge port (4). The channel 20, which has the shape of a combination of oppositely-wound square spirals described above, has a constant width from the vicinity of the refrigerant supply port to the vicinity of the refrigerant discharge port.

Figure 5A:
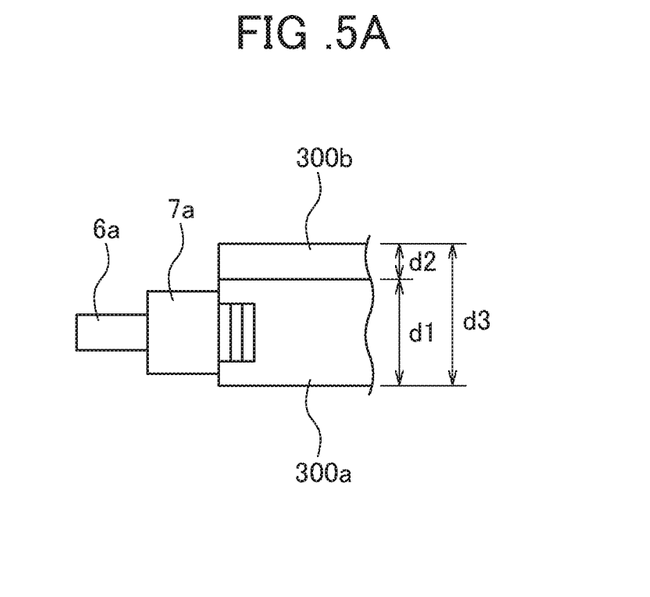
FIG. 5A is a diagram for explaining effects of a comparative reference example.
Figure 5B:
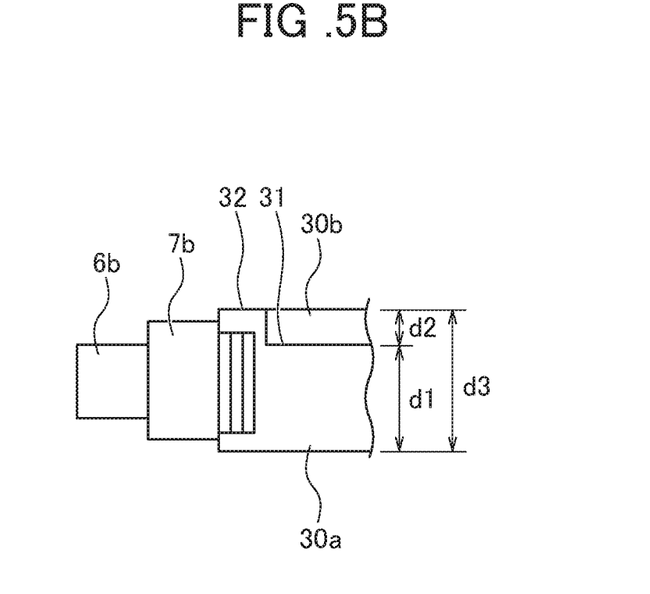
FIG. 5B is a diagram for explaining effects of the jacket body shown in FIG. 4.

Next, effects of the jacket body 30 of FIG. 4 will be described with reference to the drawings. FIG. 5A is a diagram explaining effects of a jacket body of a comparative reference example. FIG. 5B is a diagram explaining the effects of the jacket body of FIG. 4.

In the comparative reference example shown in FIG. 5A, a jacket body 300 is composed of a body plate 300a formed in a substantially flat plate shape as a whole, and a closure plate 300b formed in a substantially flat plate shape. The closure plate 300b is joined to a side as a main surface of the body plate 300a such that the outer peripheral edges of these plates coincide with each other. Therefore, the sum of a thickness d1 of the body plate 300a and a thickness d2 of the closure plate 300b placed on the body plate 300a constitutes a thickness d3 of the jacket body 300. It is desired to configure the jacket body 300 to be thin by designing the thickness d3 as small as possible. Therefore, a limitation is imposed on the thickness d1 of the body plate 300a into which a hose joint 7a for connecting a hose 6a is screwed. As a result, the hose joint 7a and thus the hose 6a both having a relatively small diameter have to be employed.

In contrast, in the case of the jacket body 30 of FIG. 4, in the body plate 30a having a thickness d3 at an end portion 32, a recess 31 with a depth corresponding to a thickness d2 of the closure plate 30b is formed as a stepped portion, as shown in FIG. 5B. A bottom portion of the recess 31 formed in the body plate 30a in the thickness direction and having the thickness d2 has a thickness d1. Therefore, when the body plate 30a and the closure plate 30b are joined to each other, the closure plate 30a is received in the recess 31 so that the thickness d2 of the closure plate 30b does not result in an increase in the thickness d3 of the jacket body 30. On the other hand, at the end portion 32 of the body plate 30a, the thickness d3 of the body plate 30a, as it is, constitutes the thickness d3 of the jacket body 30. In other words, at the end portion 32 of the body plate 30a, joining of the closure plate 30b causes no increase in the thickness of the jacket body 30. This feature removes an impediment to a decrease in the thickness and eliminates the need to limit the thickness. Thus, it is ensured that the end portion 32 of the body plate 30a has a sufficient thickness, making it possible to connect a hose joint 7b having a relatively large diameter, and consequently, to employ a hose 6b having a relatively large diameter. Therefore, a pressure loss is reduced in the circulation of the refrigerant, and a cooling jacket device having excellent cooling efficiency is achieved.

Figure 6A:
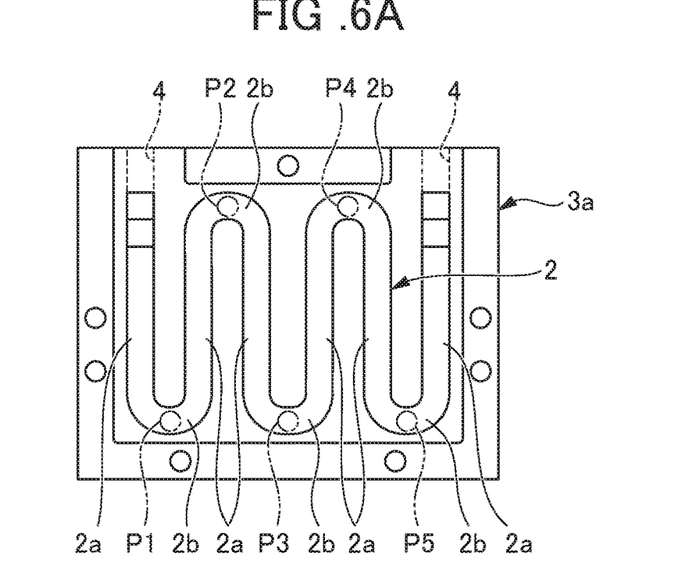
FIG. 6A is a diagram showing a shape of a channel of the jacket body shown in FIG. 2A.
Figure 6B:
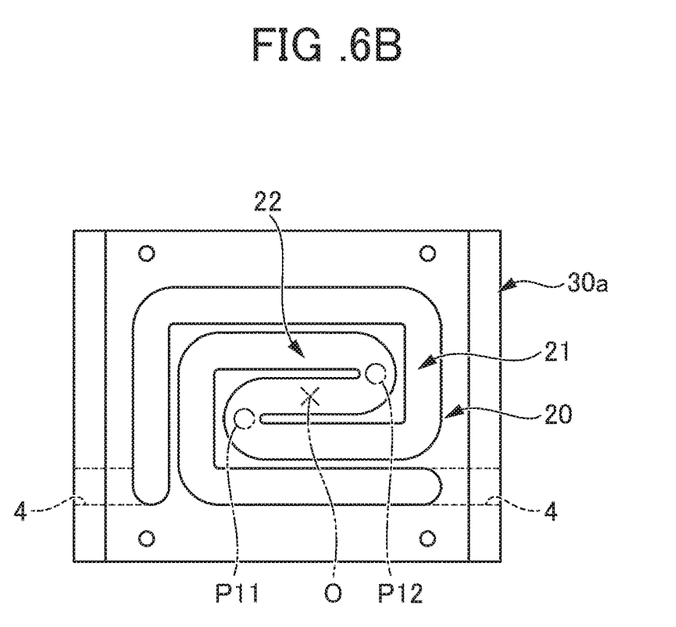
FIG. 6B is a diagram showing a shape of a channel of the jacket body shown in FIG. 4.

Next, with reference to FIGS. 6A and 6B, shapes of the channels of the jacket bodies and effects exerted by the shapes will be described. FIG. 6A is a diagram showing the shape of the channel formed in the body plate 3a of the jacket body 3 described with reference to FIGS. 1, 2A and 2B. FIG. 6B is a diagram showing the shape of the channel formed in the body plate 30a of the jacket body 30 of FIG. 4.

In the case of the body plate 3a shown in FIG. 6A, the channel 2 as one continuous channel is composed of six straight portions 2a and connecting portions 2b arranged at five locations and connecting ends of adjacent ones of the straight portions 2a. The connecting portions 2b arranged at the five locations have hairpin-shaped folded portions P1 to P5 where the flow of the refrigerant turns by 180 degrees. For this reason, a relatively large pressure loss is caused in the course from the refrigerant supply port to the refrigerant discharge port.

In the example shown in FIG. 6B, as described earlier, the channel 20 of the body plate 30a is composed of the centripetally-winding channel portion 21 and the centrifugally-winding channel portion 22 that are connected to each other in the vicinity of the center of the body plate 30a so as to be continuous with each other, so that the channel 20 has the shape of a combination of oppositely-wound square spirals. The centripetally-winding channel portion 21 has the shape of a square spiral that winds centripetally inwardly in the clockwise direction from the refrigerant supply port as the inlet/outlet port 4 shown on the left in FIG. 6B, toward the center O of the body plate 30*a*. The centrifugally-winding channel portion 22 has the shape of an inverted square spiral that starts from the vicinity of the center O of the body plate 30*a* corresponding to the flow end of the channel as the centripetally-winding channel portion 21, and that after being folded, winds centrifugally outwardly in the counterclockwise direction so as to reach the refrigerant discharge port as the other inlet/outlet port 4.

That is, the flow end of the centripetally-winding channel portion 21 is the flow start point of the centrifugally-winding channel portion 22, and corresponds to the center O. The centripetally-winding channel portion 21 starting from the refrigerant supply port has a plurality of bent portions with a bending angle of 90 degrees or less, and thereafter, forms a hairpin-shaped folded portion. P11 where the flow of the refrigerant turns by 180 degrees, as a bent portion directly before the flow end (O). The centrifugally-winding channel portion 22 forms, as the bent portion closest to the flow start point (O), a hairpin-shaped folded portion P12 where the flow of the refrigerant turns by 180 degrees, and thereafter, forms a plurality of bent portions with a bending angle of 90 degrees or less before reaching the refrigerant discharge port. As can be seen, in the example shown in FIG. 6B, the hairpin-shaped folded portions P11, P12 which dominantly affects the pressure loss in the channel from the refrigerant supply port to the refrigerant discharge port are present at only two locations. Therefore, the pressure loss caused in the course from the refrigerant supply port to the refrigerant discharge port is smaller than in the case shown in FIG. 6A. Further, the channel 20, which has the shape of a combination of oppositely-wound square spirals, has a constant width from the vicinity of the refrigerant supply port to the vicinity of the refrigerant discharge port, also in the hairpin-shaped folded portions P11, P12. Therefore, the so-called single-stroke processing can be applied, and an effect of shortening tact time in the processing is achieved in manufacturing.

Furthermore, the embodiment shown in FIG. 4 exerts the following effects. The loop-shaped seal member 25 is sandwiched near the outer peripheral edge of the joining plane between the body plate 30*a* and the closure plate 30*b*, the loop-shaped seal member 25 being made from a material that is excellent in heat resistance, oil resistance, mechanical strength, and compression set resistance, such as HNBR (hydrogenated nitrile rubber). This feature achieves a better deformation following property with respect to deformation of the closure plate 30*b* than a case where a metal gasket is employed instead of the loop-shaped seal member 25. As a result, this feature eliminates the need to use a thick member as the closure plate 30*b* for the purpose of ensuring stiffness. Furthermore, this feature eliminates the need to use large screws or an increased number of screws to join the body plate 30*a* to the closure plate 30*b*. Thus, the costs can be reduced.

Embodiments of the cooling jacket device and the rotary electric machine have been described in the foregoing. However, the present invention is not limited to the above-described embodiments, and modifications can be made to the present invention as appropriate, without departing from the spirit of the present invention.

For example, FIG. 1 shows, as an embodiment, the cooling jacket device 1 including four jacket bodies 3 which are configured to be in contact with four locations of the outer peripheral surface of the heat generating portion of the rotary electric machine. However, the number and the arrangement of the jacket bodies 3 can be suitably determined in accordance with the shape of a rotary electric machine (the shape of the outer peripheral surface of a heat generating portion (the number of planar portions)), cooling efficiency and the like. For example, if a rotary electric machine has seven planar portions on the outer peripheral surface of a heat generating portion, it is suitable to configure the cooling jacket device 1 to include seven jacket bodies 3 to be in contact with the respective planar portions.

EXPLANATION OF REFERENCE NUMERALS

1: Cooling Jacket Device
2, 20: Channel
2*a*: Straight Portion
2*b*: Connecting Portion
3, 30: Jacket Body (Cooling Jacket)
3*a*, 30*a*: Body Plate
3*b*, 30*b*: Closure Plate
4: Inlet/Outlet Port (Refrigerant Supply Port, Refrigerant Discharge Port)
5: Coupling Member
6, 6*a*, 6*b*: Hose (Tubular Member)
7, 7*a*, 7*b*: Hose Joint
21: Centripetally-Winding Channel Portion
22: Centrifugally-Winding Channel Portion
32: End Portion

What is claimed is:

1. A cooling jacket device for cooling a heat generating portion of a rotary electric machine by being disposed to surround the heat generating portion, the cooling jacket device comprising:
 a plurality of jacket bodies each of which is formed in a substantially flat plate shape and includes therein a channel communicating with a pair of inlet/outlet ports formed in an outer surface of the jacket body, the channel allowing a refrigerant to flow therethrough;
 a plurality of coupling members which couple and retain the plurality of jacket bodies in conformity with an outer peripheral shape of the heat generating portion of the rotary electric machine; and
 a plurality of tubular members which are connected to the inlet/outlet ports, through which the refrigerant discharged from one of the inlet/outlet ports of one of the plurality of jacket bodies is sent to one of the inlet/outlet ports of another one of the plurality of jacket bodies so that the refrigerant flows through the channels of the plurality of jacket bodies;
 wherein each of the jacket bodies includes
 a body plate formed in a substantially flat plate shape and having a groove recessed in one surface toward an opposite surface,
 a closure plate formed in a substantially flat plate shape, detachably and integrally attached to the one surface of the body plate to seal the groove opening at the one surface of the body plate and thereby forming the channel together with the body plate, and
 the jacket bodies are dismountable; wherein
 the channel formed by the groove of the body plate is composed of a centripetally-winding channel portion and a centrifugally-winding channel portion that are connected to each other in a vicinity of a center of the body plate so as to be continuous with each other, so that the channel has a shape of a combination of oppositely-wound square spirals, the centripetally-winding channel portion has a shape of a square spiral that winds centripetally inwardly in a clockwise direction from one of the inlet/outlet ports serving as a refrigerant supply port toward the center of the body plate, and the centrifugally-winding channel portion has a shape of an inverted square spiral that starts from the vicinity of the center of the body plate corresponding to a flow end of the channel as the centripetally-winding channel portion, and that after being folded, winds centrifugally outwardly in the counterclockwise direction so as to reach the other of the inlet/outlet ports serving as a refrigerant discharge port.

2. A rotary electric machine comprising the cooling jacket device according to claim 1.

3. A cooling jacket device for cooling a heat generating portion of a rotary electric machine by being disposed to surround the heat generating portion, the cooling jacket device comprising:

a plurality of jacket bodies each of which is formed in a substantially flat plate shape and includes therein a channel communicating with a pair of inlet/outlet ports formed in an outer surface of the jacket body, the channel allowing a refrigerant to flow therethrough;

a plurality of coupling members which couple and retain the plurality of jacket bodies in conformity with an outer peripheral shape of the heat generating portion of the rotary electric machine; and a plurality of tubular members which are connected to the inlet/outlet ports, through which the refrigerant discharged from one of the inlet/outlet ports of one of the plurality of jacket bodies is sent to one of the inlet/outlet ports of another one of the plurality of jacket bodies so that the refrigerant flows through the channels of the plurality of jacket bodies;

wherein each of the jacket bodies includes a body plate formed in a substantially flat plate shape and having a groove recessed in one surface toward an opposite surface, a closure plate formed in a substantially flat plate shape, detachably and integrally attached to the one surface of the body plate to seal the groove opening at the one surface of the body plate and thereby forming the channel together with the body plate, and the jacket bodies are dismountable; wherein the channel formed by the groove of the body plate is composed of a centripetally-winding channel portion and a centrifugally-winding channel portion that are connected to each other in a vicinity of a center of the body plate so as to be continuous with each other, so that the channel has a shape of a combination of oppositely-wound square spirals, the centripetally-winding channel portion has a shape of a square spiral that winds centripetally inwardly in a counterclockwise direction from one of the inlet/outlet ports serving as a refrigerant supply port toward the center of the body plate, and the centrifugally-winding channel portion has a shape of an inverted square spiral that starts from the vicinity of the center of the body plate corresponding to a flow end of the channel as the centripetally-winding channel portion, and that after being folded, winds centrifugally outwardly in the clockwise direction so as to reach the other of the inlet/outlet ports serving as a refrigerant discharge port.

4. A rotary electric machine comprising the cooling jacket device according to claim 3.

\* \* \* \* \*